UNITED STATES PATENT OFFICE.

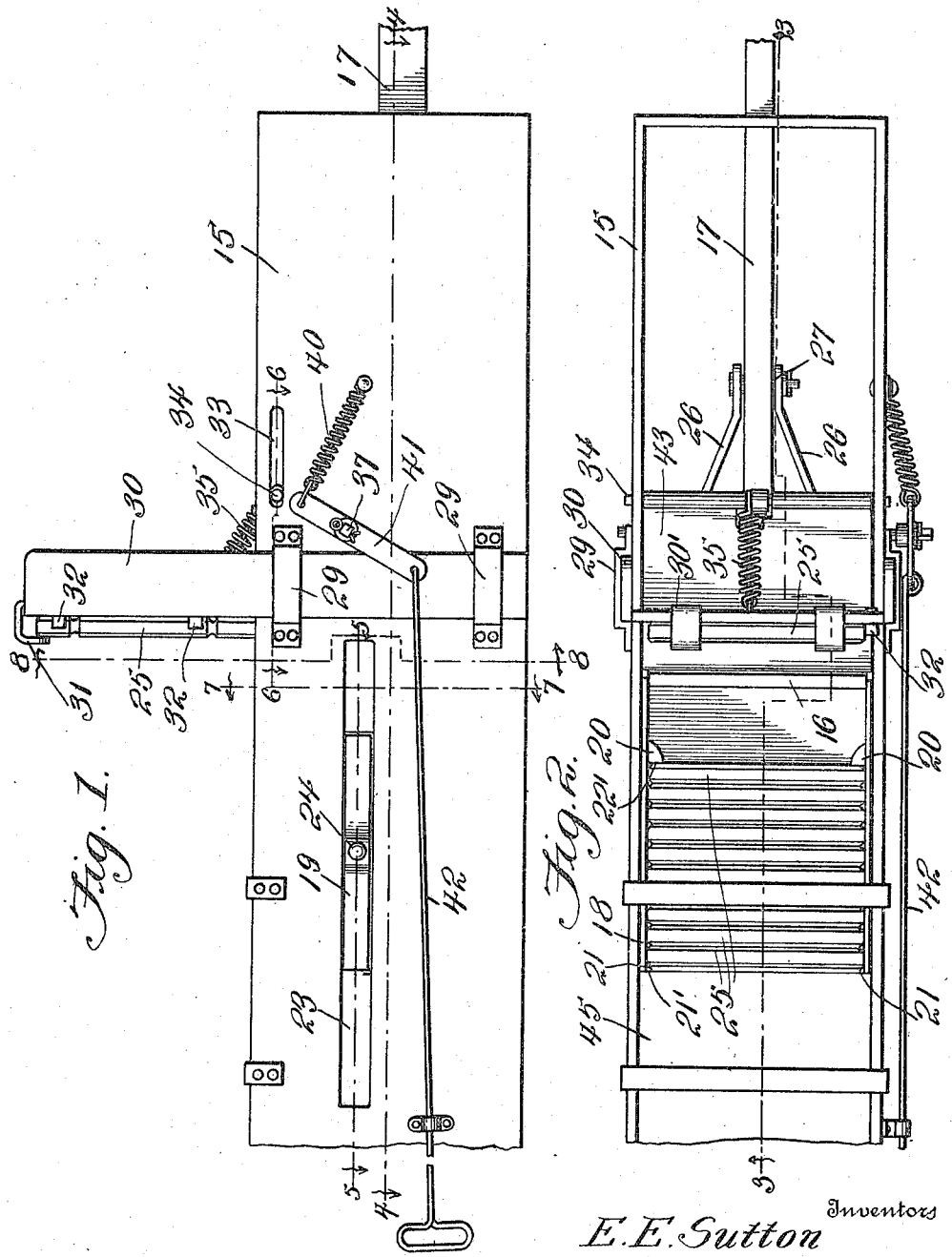

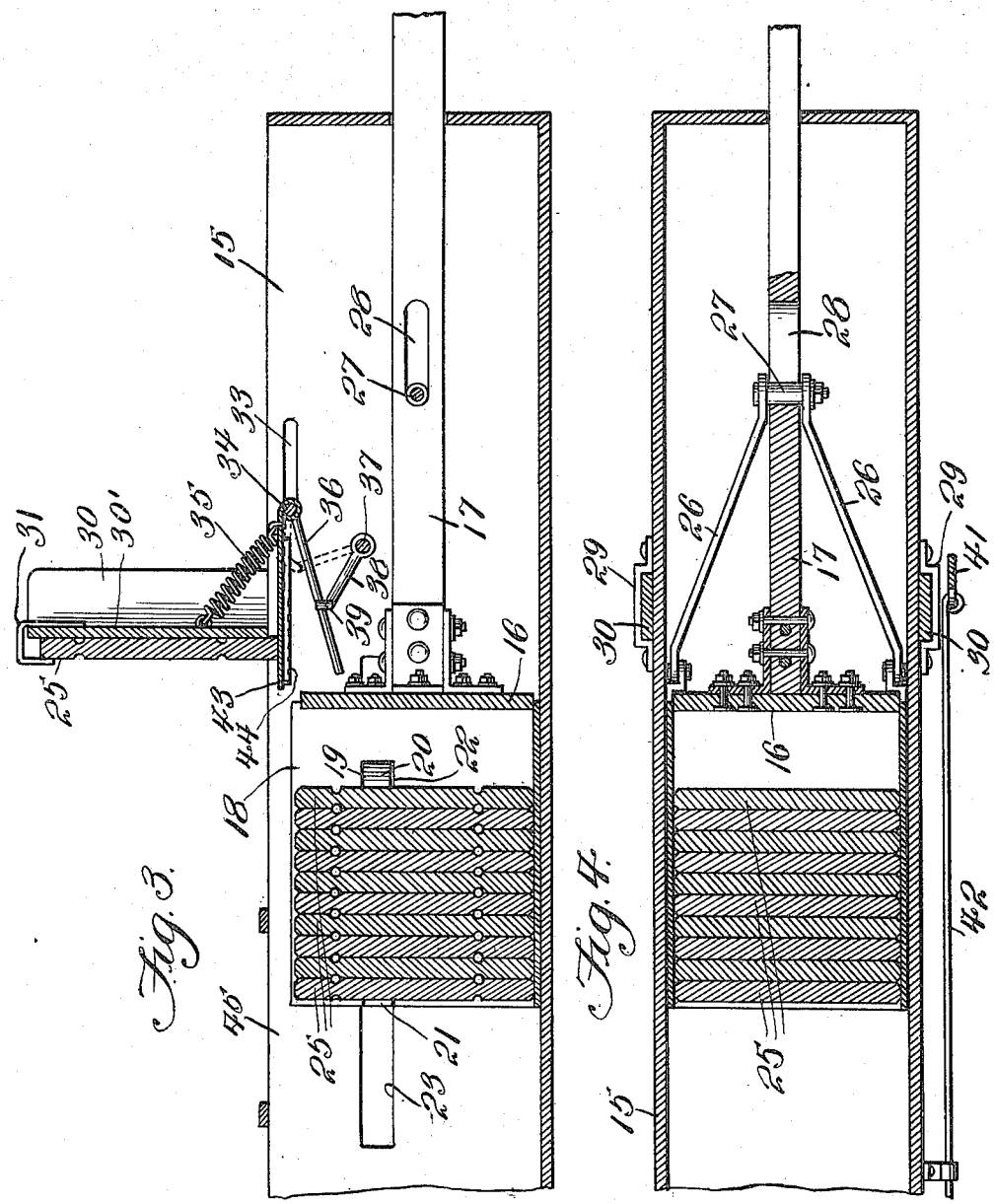

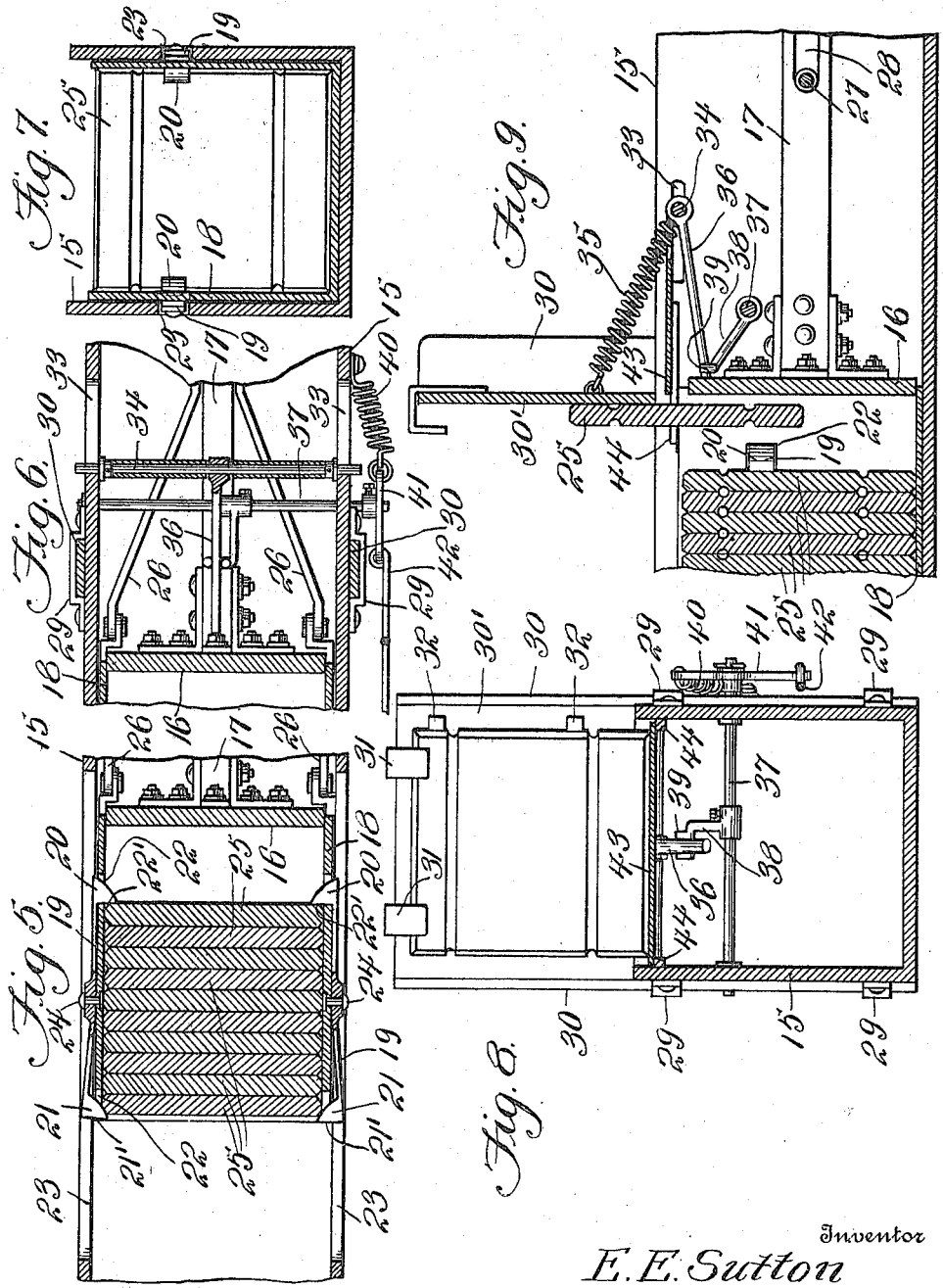

EMERY E. SUTTON AND JAMES W. BAKER, JR., OF SIKESTON, MISSOURI.

BALING-PRESS.

1,221,625.

Specification of Letters Patent.

Patented Apr. 3, 1917.

Application filed September 27, 1916. Serial No. 122,524.

*To all whom it may concern:*

Be it known that we, EMERY E. SUTTON and JAMES W. BAKER, Jr., citizens of the United States, residing at Sikeston, in the county of Scott and State of Missouri, have invented new and useful Improvements in Baling-Presses, of which the following is a specification.

This invention relates to baling presses and particularly presses for baling hay.

In hay presses of most of the types now generally used partition blocks are interposed between the bales that are being formed, said partition blocks being grooved for the passage of the tie wires. These partition blocks are commonly inserted through the feed opening of the press box while the plunger is retracted, and unless the partition block is fully inserted within the press chamber there is danger of its being broken by the plunger when the latter is projected. As the press chamber is usually more or less obstructed with hay it is a difficult matter to properly insert the partition block unless operation of the press is interrupted for a sufficient length of time to enable the press chamber to be cleared for the proper insertion of the block, thereby causing loss of time.

The present invention has for its object to produce a baling press in which the partition block may be inserted instantaneously, without loss of time by interruption of the operation of the press and without danger of the block being broken even when the press is being operated at high speed.

A further object of the invention is to produce a baling press embodying in its construction a box or chamber in which a plurality of partition blocks is accommodated, said box being operatively connected with the plunger, the pressure of which is transmitted through the blocks contained in the box to the material that is being compressed, means being provided for dropping, at any time and at the will of the operator, an additional block into said box in advance of the plunger, the next projecting movement of which will serve to expel the partition block from the box into the baling chamber where it will be properly located between the bale and the charge of hay next introduced into the baling chamber.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a side elevation of a baling press constructed in accordance with the invention.

Fig. 2 is a top plan view of the same.

Fig. 3 is a longitudinal sectional view taken on the line 3—3 in Fig. 2.

Fig. 4 is a horizontal sectional view taken on the line 4—4 in Fig. 1.

Fig. 5 is a horizontal sectional detail view taken on the line 5—5 in Fig. 1.

Fig. 6 is a horizontal sectional detail view taken on the line 6—6 in Fig. 1.

Fig. 7 is a transverse sectional view taken on the line 7—7 in Fig. 1.

Fig. 8 is a transverse sectional view taken on the line 8—8 in Fig. 1.

Fig. 9 is a longitudinal vertical sectional detail view showing the partition block in the act of being dropped.

Corresponding parts in the several figures are denoted by like characters of reference.

Referring to the drawings, 15 designates the press box, there being shown as much of said press box as is necessary for the illustration of the present invention, and it being understood that said press box may be of any desired length so as to accommodate one or more completed bales of hay in addition to the bale that is in process of formation, the completed bale or bales serving by frictional engagement with the walls of the press box to form the requisite resistance that will enable the bale which is in process of formation to be properly compressed. The tail end or discharge end of the press is omitted from the drawing, as it forms no part of the present invention.

The plunger 16 having the stem 17 is arranged in the customary manner within the press box, said plunger being adapted to be longitudinally reciprocated by suitable means, not shown. Arranged within the press box for longitudinal reciprocatory movement is a block box or container 18, said box or container being open at the top and at both ends. It is desirable that said box should occupy but very little room, and inasmuch as it will, in practice, be subjected to little or no strain, it may be appropriately manufactured of material such as sheet steel, the side and bottom walls of said container being arranged to fit snugly against the side and bottom walls of the press box. Fixed exteriorly on each side wall of the box 18 is a spring 19 having terminal beveled catches 20, 21 that project within the box 18 through notches or apertures 22 in the side walls thereof. The side walls of the press box are each provided with an elongated slot 23 to accommodate the spring 19, said slot being of proper length to permit the box or container 18 to move longitudinally within the press box to the requisite extent. Each spring 19 is secured on the box 18 by a fastening member 24 about midway between its ends so as to give proper freedom of movement to the ends carrying the catch members 20 and 21. Said catch members have faces that are beveled in the direction of the plunger 16, and they are provided with abrupt shoulders 21', 22' facing the tail end of the press box. Arranged in the box or container 18 are a plurality of partition blocks 25 which may be of any approved conventional construction, the foremost one of said blocks abutting on the shoulders 22' of the catch members 20, while the rearmost one of said blocks is positioned between the beveled catch members 21 which are thereby forced outward into the slots 23 in the side walls of the press box. It may be stated that the principal function of the spring catches 21, 22 is to maintain the partition blocks 25 in an upright position, and it will also be seen that the parts are so arranged and proportioned that the ends of the springs 19 having the catch members 22 will be spaced from the front end of the box or container 18 to enable the plunger to move for a limited space within said container.

The box 18 is connected with the plunger stem 17 by means of a pair of straps 26, the rearward ends of which are connected with the side walls of the box 18, said straps being converged forwardly in the direction of the plunger stem, and the forward ends of said straps being connected together by a bridge piece 27 that extends through a slot 28 in the plunger stem. By reason of this construction it will be seen that the plunger is free to move a short distance within the container 18 before it projects the latter in the direction of the tail end of the press box and also that at the beginning of the retractive movement of the plunger it will move forwardly within the container 18 before the latter is retracted. The box or container 18, together with the partition blocks contained therein, may thus be regarded to all intents and purposes as constituting a part of the plunger which is connected therewith for independent longitudinal movement which is limited by the extent of the slot 28, the length of which coincides with the distance between the foremost block 25 contained in the box 18 and the front end of said box.

The press box is provided with keepers 29 on the external faces of both side walls thereof for the reception of the limbs 30 of a block supporting device which in addition to said limbs consists of a plate or wall member 30' which is of a width equal to the width of the press box and which is securely connected with the limbs 30 which are thereby connected and spaced apart. The wall member or plate 30' is provided at its upper edge with retaining hooks 31, and blocks or stop members 32 are secured on the rearward face thereof adjacent to one side edge to limit the movement of the partition blocks when the latter are placed in position.

The side walls of the press box are provided with longitudinal slots 33 for the accommodation of a rock shaft 34, said shaft being connected with the plate or wall member 30' by means of a spring 35, whereby the rock shaft is forcibly moved in a rearward direction to an extent limited by the length of the slots 33. The rock shaft 34 is provided with a rearwardly extending radial arm 36. 37 is a rock shaft supported transversely in the press box just beyond the limit of the forward movement of the plunger 16, said rock shaft having an arm 38 provided with a terminal loop 39 engaging the arm 36 so that by rocking movement of the shaft 37 the arm 36 may be moved in an arc at one limit of which the end of the arm 36 will be presented in the path of the plunger 16, while at the other limit of its movement the arm 36 will occupy a nearly horizontal position, permitting the plunger to pass beneath the said arm 36. In the latter position the arm 36 is normally maintained by the action of a spring 40 one end of which is mounted on a side wall of the press box, the other end of said spring being connected with an arm or lever 41 on the shaft 37. Connected with the arm or lever 41 is one end of an operating rod 42 which may be manually operated to rock the shaft 37 against the tension of the spring 40, thereby causing the arm 36 to be presented in the path of the plunger 16. Pivotally connected with the shaft 34 is a supporting plate 43 resting on guide cleats 44 and extending beneath and to the rearward of the wall member 30' so as to afford a supporting means for a partition block 25 when placed in position thereon by an operator.

When a block is placed in position on the plate 43 adjacent to the wall member 30', the stop members 32 serve to regulate the position of the partition block so that it will register with the press box, thereby greatly facilitating the proper placing of the block. When the press is in operation material is fed into the press box through an opening 45 which is to the rearward of the block container 18 when the latter is retracted. By the forward movement of the plunger head 16 the latter covers the space between the front end of the container 18 and the foremost block 25 contained therein, and the plunger then pushes the container 18 in a rearward direction, exerting pressure through the blocks 25 placed in the container and of which there may be any desired number. The material is thus compressed and forced in the direction of the tail end of the press box, the blocks 25 within the container serving temporarily to obstruct communication between the feed opening and baling chamber. By the retracting movement of the plunger the latter first moves in the direction of the front end of the press box until the limit of its independent movement with respect to the container 18 is reached; said container then moves with the plunger in a forward direction. This operation continues until sufficient material to form a bale has been compressed in the baling chamber. The operator then, by means of the rod 42, actuates the rock shaft 37 against the tension of the spring 40, causing the arm 38 having the loop 39 to pull the arm 36 down in the path of the plunger while the latter is in a projected position. By the return movement of the plunger the arm 36 will be engaged with the result of pushing the rock shaft 34 forwardly in the slots 33 against the tension of the spring 35, also pulling the supporting plate 43 from beneath the block 25 which has previously been placed in position. Said block will now drop down into the empty space at the forward end of the container 18 so as to lie in the path of the plunger 16 when the latter is again projected. When the plunger is again projected it will abut on the partition block 25 which has been just inserted, and it will push the said block and the blocks previously within the container in a rearward direction, the rearmost block being released from the catches 22 and left within the baling chamber when the plunger and the container are again retracted. It being understood that the partition blocks are of equal thickness, it is evident that the block last inserted will occupy a space equal to that occupied by the partition block just discharged from the container, thus placing the press in condition to proceed with the operation without interruption. When the operating rod 42 is released by the operator, the spring 40 serves to restore the rock shaft 37 to its initial position while the rock shaft 34 and related parts will be restored to initial position by the action of the spring 35.

While it is desirable that the block 25 should drop from its position on the supporting plate 43 to the bottom of the container 18 when it is released in the manner described, its failure to do so would not expose it to breakage, there being nothing whatever to obstruct its movement in a rearward direction under the impulse of the plunger.

While the container 18 has been shown as being composed of side walls and a bottom member, the bottom member might be dispensed with provided that the side wall members are otherwise adequately connected together.

Having thus described the invention, what is claimed as new, is:—

1. In a baling press, a press box, a reciprocating plunger, and a partition block container operatively connected with the plunger for sliding reciprocatory movement in the press box.

2. In a baling press, a press box, a reciprocating plunger, a partition block container fitted for reciprocation in the press box, and a connection between the plunger and the container whereby the plunger may move a predetermined distance independently of the container.

3. In a baling press, a press box having longitudinally slotted side walls, a partition block container fitted in the press box, and spring catch members carried by the container and operable through the slots in the side walls of the press box, said spring catch members having beveled front portions and abrupt rear wall portions, the side walls of the container being provided with notches through which the spring catches normally project.

4. In a baling press, a press box having longitudinally slotted side walls, a partition block container fitted in the press box, and spring catch members carried by the container and operable through the slots in the side walls of the press box, said spring catch members having beveled front portions and abrupt rear wall portions, the side walls of the container being provided with notches through which the spring catches normally project, in combination with a reciprocating plunger operatively connected with the container.

5. In a baling press, a press box having longitudinally slotted side walls, a partition block container fitted in the press box, and spring catch members carried by the container and operable through the slots in the side walls of the press box, said spring catch members having beveled front portions and abrupt rear wall portions, the side walls of the container being provided with notches through which the spring catches normally project, in combination with a reciprocating plunger operatively connected with the container; the plunger being capable of a limited predetermined movement independently of the container.

6. In a baling press, a press box having side walls provided with longitudinal slots, a container within the press box, said container having open ends and open top, springs secured on the side walls of the container and engaging the slots in the side walls of the press box, said springs having terminal beveled catches projecting within the container.

7. In a baling press, a press box having side walls provided with longitudinal slots, a container within the press box, said container having open ends and open top, springs secured on the side walls of the container and engaging the slots in the side walls of the press box, said springs having terminal beveled catches projecting within the container, in combination with a reciprocating plunger operatively connected with the container to actuate the latter and also to move a limited predetermined distance independently thereof, and partition blocks fitted in the container and maintained in position by the spring catches.

8. In a baling press, a press box, a partition block container fitted for reciprocation therein, means for sustaining a plurality of partition blocks in upright position within the container and in spaced relation to the forward end of said container, a reciprocating plunger operatively connected with the container to actuate the same and also independently movable for a limited distance within the front end of the container, and means for inserting an additional partition block between the plunger and the foremost block in the container while the latter and the plunger are retracted to the limit of their respective movements.

9. In a baling press, a press box, a partition block container fitted for reciprocation therein, means for sustaining a plurality of partition blocks in upright position within the container and in spaced relation to the forward end of said container, a reciprocating plunger operatively connected with the container to actuate the same and also independently movable for a limited distance within the front end of the container, and means for inserting an additional partition block between the plunger and the foremost block in the container while the latter and the plunger are retracted to the limit of their respective movements, said means including a trip device having a member which may be moved into the path of the plunger to be actuated thereby.

10. In a baling press, a reciprocating plunger, a block support including a wall member, a longitudinally slidable rock shaft having a pivoted supporting member extending beneath the wall member, a retracting spring whereby the rock shaft and supporting plate are actuated in the direction of the wall member, a trigger connected with the rock shaft, a second rock shaft having an arm provided with a loop engaging the trigger arm, spring means for actuating the second rock shaft to cause the looped arm to move the trigger arm out of the path of the plunger, and means for rocking the second rock shaft against the tension of its actuating spring to place the trigger arm in the path of the plunger.

11. In a baling press, a reciprocating plunger, a block support including a wall member, a longitudinally slidable rock shaft having a pivoted supporting member extending beneath the wall member, a retracting spring whereby the rock shaft and supporting plate are actuated in the direction of the wall member, a trigger connected with the rock shaft, a second rock shaft having an arm provided with a loop engaging the trigger arm, spring means for actuating the second rock shaft to cause the looped arm to move the trigger arm out of the path of the plunger, and means for rocking the second rock shaft against the tension of its actuating spring to place the trigger arm in the path of the plunger, in combination with a block container operatively connected with the plunger to be actuated thereby, said plunger having a limited movement independently of the container.

In testimony whereof we affix our signatures.

EMERY E. SUTTON.
JAMES W. BAKER, Jr.